United States Patent Office 3,778,306
Patented Dec. 11, 1973

3,778,306
TAPE
Robert H. Stow, White Bear, Minn., assignor to Minnesota Mining and Manufacturing Company, St. Paul, Minn.
No Drawing. Continuation-in-part of abandoned application Ser. No. 703,872, Feb. 8, 1968. This application Jan. 4, 1971, Ser. No. 103,872
Int. Cl. B44c 1/18; C09c 1/44
U.S. Cl. 117—226           3 Claims

ABSTRACT OF THE DISCLOSURE

An electrically conductive pressure-sensitive adhesive tape comprising a flexible electrically conductive backing and an adhesive that includes a base soft rubber-resin adhesive material and conductive carbon black dispersed in the base adhesive material.

REFERENCE TO RELATED APPLICATION

This application is a continuation-in-part of application Ser. No. 703,872, filed Feb. 8, 1968, and now abandoned.

BACKGROUND OF THE INVENTION

Nearly all past proposals for electrically conductive pressure-sensitive adhesive tapes suggest providing isolated, macroscopic, metallic paths through the adhesive layer of the tape. See, for example, U.S. Pat. 3,132,204, using stripes of metal powder compacted and pressed into the adhesive layer, and U.S. Pats. 3,311,696 and 3,355,-545, in which a metal mesh is pressed into an adhesive layer. The only two known commercially available electrically conductive pressure-sensitive adhesive tapes are of this type and use, in the one case, a monolayer of rather thick conductive particles in the adhesive layer, and in the other case, projections embossed in the conductive backing and extending at least partially through the adhesive layer.

These previous tapes have the disadvantage that they do not have volume or homogeneous conductivity. Electrical conduction will occur through the adhesive on only a limited number of finite paths, and that fact limits the uses to which the previous tapes may be put. For example, such tapes would not reliably establish electrical connection to a contact of small area, such as needed when a tape is to be used as a bus bar electrode applied against very small contact fingers extending from the channels of a circuit board being electroplated.

One known proposal in the prior art for a pressure-sensitive adhesive tape using an adhesive intended to have a degree of homogeneous electrical conductivity is U.S. Pat. 2,808,352. This patent suggests the use of finely divided silver dispersed in an adhesive material, but insofar as known such a tape has never been successfully commercialized; the approach taught in this patent has the disadvantage that use of finely divided silver would make the tape quite expensive.

It has been suggested that electrically conductive carbon black be added to certain adhesives such as solvent- or heat-activated adhesives to make the adhesives electrically conductive; see U.S. Pat. 2,498,493. But it has also been recognized that pressure-sensitive adhesives are ruined by addition of carbon black, because the carbon black deadens the tack of the adhesive; see U.S. Pat. 2,670,306. Insofar as is known, no one has previously made an electrically conductive pressure-sensitive adhesive tape by adding carbon black to the adhesive, and in fact, insofar as is known, no one has previously made a successful pressure-sensitive adhesive tape that exhibits homogeneous or volume electrical conductivity.

SUMMARY OF THE INVENTION

The present invention provides an electrically conductive pressure-sensitive adhesive tape in which the adhesive is loaded with conductive carbon black. More specifically, a tape of this invention includes a flexible electrically conductive backing and, on at least one surface of this backing, a thin layer of conductive adhesive. The adhesive includes a base, rubber-resin, pressure-sensitive adhesive material that is quite soft—too soft, in fact, for general usage as a pressure-sensitive adhesive. Electrically conductive carbon black is uniformly dispersed in this base adhesive material in an amount between about 25 and 70 parts of black for each 100 parts of base adhesive material.

Although carbon black has the recognized effect of deadening tack, it has been found that the use of a base rubber-resin adhesive material that is quite soft or low in internal strength compensates for the deadening effect of the black. A mixture of this soft adhesive material and conductive carbon black exhibits the pressure-sensitive adhesive characteristics of aggressive and permanent tackiness at room temperature and firm adherence to a variety of dissimilar surfaces upon mere contact without more than finger or hand pressure, and yet in thin layers on a tape also exhibits good, substantially homogeneous, electrical conductivity. For example, when a terminal having a contact area of about 0.001 square inch is laid randomly against the surface of the adhesive layer of a tape of this invention, conduction will routinely occur through the tape. The resistance through the adhesive layer of the tape will generally be less than one ohm per square inch, and in preferred embodiments will generally be lower than 0.05 ohm per square inch, and yet the tape will exhibit a pressure-sensitive adhesion of at least 10 ounces per inch of width (as measured in ASTM D–1000).

DETAILED DESCRIPTION

Rubber-resin mixtures, including a base rubbery or elastomeric constituent and a resin that tackifies the rubber, are a well known class of useful pressure-sensitive adhesive materials. Natural rubber is one suitable rubbery or elastomeric constituent. Upon extended milling, especially when maintained in a cool condition (less than about 150° F.) and in the presence of oxygen not inhibited by an antioxidant, the natural rubber molecule breaks down and results in a softer material. Other useful elastomers in rubber-resin base adhesive materials of this invention are styrene-butadiene elastomers, silicone elastomers, and butyl elastomers. Resins useful to tackify the base rubber or elastomer in rubber-resin mixtures include rosin, esters of rosin and modified resins, coumarone-indene resins, polyterpene resins, pinene and phenolic condensates, phenolic resins, and silicone resins.

Softening natural rubber by milling it is one useful way that has been found to produce a base adhesive material for carbon black-loaded adhesives of the necessary pressure-sensitive adhesive characteristics. Alternative methods include using an inherently soft rubber or using either a resin that is softer than normally used in any very large amount in a pressure-sensitive adhesive or a plasticizer. When carbon black is thoroughly dispersed in such a properly softened rubber-resin adhesive material, electrical conductivity is obtained while the necessary pressure-sensitive adhesive characteristics are also maintained.

The suitability of a base rubber-resin adhesive material for use in carbon black-loaded electrically conductive pressure-sensitive adhesive tapes can be indicated by measuring the softness or internal strength of the base adhesive material. In one suitable test for measuring internal strength, two one-half-inch-wide strips of a flexible backing material coated with the adhesive material being tested are arranged in longitudinal alignment with their adhesive surfaces together and with the strips overlapped one-half-inch; the overlapped portions of the two strips are pressed together by rolling with a weighted roll in a typical manner. The assembly is then suspended by a hook attached to the free end of one of the strips, and a 1000-gram weight is suspended from a hook attached to the free end of the other strip. The time for the bond between the two strips to fail, by complete separation of the tapes and falling of the weight, is a measure of the softness of the base adhesive material. To obtain satisfactory adhesives of this invention, the base rubber-resin adhesive material, without carbon black, should exhibit an internal strength in this test of less than 15 minutes, and preferably less than 10 minutes.

A variety of electrically conductive carbon blacks, generally classified as such by the manufacturer, are useful in adhesives of this invention. In general, these conductive carbon blacks have a small particle diameter, a high surface area, a high degree of permanent chain structure tending to give the particles a long particle shape, and a low volatile content. Oil-furnace blacks appear to give better conductivity than channel blacks of equivalent particle size. Highly extensive mixing of the adhesive and carbon black is undesirable since it will break up the carbon black to an undesirable amount. When tapes of this invention are viewed under the microscope, it is seen that the carbon black and base adhesive material do not form a completely homogeneous material, though they provide substantially homogeneous electrical conductivity; that is, the adhesive is revealed as having a soft granular structure containing particle-rich areas through which conduction presumably occurs.

To obtain substantially homogeneous conductivity, the adhesives of this invention should include about 25 or more parts of carbon black per 100 parts of the rubber-resin base adhesive material. On the other hand, to avoid unduly reinforcing the adhesive, there should be less than about 70 parts of carbon black per 100 parts of base adhesive material. Preferably, the carbon black is included in an amount between about 40 and 55 parts of carbon black per 100 parts of base adhesive material. Generally, the adhesive will be free of other particulate materials. For the best conductivity, the adhesive should be applied in a rather thin layer, less than 2 mils thick, for example, and even more preferably less than 1 mil thick.

Thin metal foils provide the most widely usable flexible electrically conductive backing. Many other conductive materials such as metallized films may also be used, and for some purposes, less conductive materials having an electrical resistivity of up to about 1000 ohm-centimeters may be used. When foils of oxidizable metals such as copper are used as the backing, it is often desirable to incorporate a combination of antioxidants and chelating-type inhibitors in the adhesive.

Example 1

Nine-hundred grams of natural rubber were milled on a two-roll rubber mill until the rubber formed a smooth band around one of the rolls. Next, 225 grams of a polyterpene resin that softens at 25° C. (Piccolyte S25, supplied by Pennsylvania Industrial Chemical Company) were gradually added. After completion of this addition, the rubber had been milled for a total time of 25 minutes.

Half of the mixture from the mill was charged to a ⅞-gallon Baker-Perkins Mogul mixer, together with 225 grams of a polyterpene resin that softens at about 115° C. (Resin 1010, supplied by Hercules, Inc.) and 237 grams of Vulcan XC 72 electrically conductive carbon black (supplied by the Cabot Corporation). With cold water in the jacket of the mixer, the mixing operation continued for 55 minutes, during which additional increments of the Resin 1010 polyterpene resin and the carbon black were added until 405 grams of the Resin 1010 polyterpene resin and 475 grams of the carbon black were included in the final mixture. At the end of 55 minutes, the power input was over 1200 watts. During another 10 minutes of mixing, the power input gradually dropped to 880 watts. Then 70 grams more of the Resin 1010 polyterpene resin were added, along with 9 grams of 4,4-thio-bis(6 tert-butyl meta cresol) (Santonox R, supplied by Monsanto Co.) and 3 grams of disalicylal propylene diamine (Copper Inhibitor 50, supplied by E. I. du Pont de Nemours and Company). Steam at a pressure of 40 pounds per square inch was then introduced into the jacket of the mixer for 5 minutes to soften the adhesive. After this, 3060 grams of heptane were gradually added, part of this solvent being mixed in after the batch was removed from the mixer.

This solution of adhesive was knife-coated on one-ounce, dead-soft copper foil (having a weight of one ounce per square foot), and the coated solution of adhesive was dried four minutes at 75° F. and then two minutes at 150° F. to complete an electrically conductive pressure-sensitive adhesive tape. The dry adhesive layer had a weight of 3.8 grains per 24 square inches. The adhesion of this tape was measured as 38 ounces per inch of width by the test method of ASTM D–1000.

The resistance through the tape was measured by first laying the tape on a gold-plated brass electrode having a surface area of one square inch, adhesive side up. A second gold-plated brass electrode having a surface area of one square inch was then laid on the adhesive side of the tape in alignment with the first electrode and a weight was applied to the top electrode sufficient to produce a pressure of five pounds per square inch. An electrical power supply was connected across the electrodes, and a rheostat in the circuit adjusted so that the power supply delivered 0.1 ampere. A voltmeter, also connected across the electrodes, measured the voltage drop, from which the resistance was calculated. Using this method, it was found that the tape of this example exhibited a resistance through the tape of 0.024 ohm per square inch.

The homogeneous conductivity of the tape was measured by adhering the tape on the surface of a test panel in which were exposed the end surfaces of 144 isolated copper channels each 0.031 inch square. Resistance was then measured between the copper backing of the tape and each of the channels by contacting the backing and the channel measured with probes from an ohmmeter having an internal power supply (Simpson 262 meter made by the Simpson Electric Co.). Measured by this method, the tape of this example had a low-resistance connection to each of the 144 channels. Preferred tapes of this invention make contact with at least 99 percent of the channels in this test.

The internal strength of the base adhesive material was determined by preparing a batch of material similar to the black-loaded adhesive except for omission of the black. This base adhesive material was coated on the same copper foil as used in the carbon black-loaded tape of this example, and the internal strength of the base adhesive material then measured as eight minutes by the method described above. By contrast, the internal strength of the black-loaded tape of this example was measured as 720 minutes.

Example 2

Four-hundred grams of a styrene-butadiene elastomer in which the proportion of styrene and butadiene is 23.5 and 76.5 weight percent, respectively (FRS1004, supplied by Firestone Tire & Rubber Co.) together with 4 grams of an anti-oxidant mixture of alkylated aryl phosphites (Polygard, supplied by Uniroyal, Inc.) were milled on a cool two-roll rubber mill until the mixture was smooth and formed a band around one of the rolls. Following this operation, 225 grams of a hard, brittle, hydrogenated wood rosin (Staybelite, supplied by Hercules, Inc.) were gradually mixed with material on the mill. When addition of the rosin was complete, the rubber had been milled for a total time of 15 minutes.

This mixture was then removed from the mill and charged to a ⅞-gallon Baker-Perkins Mogul mixer together with 225 more grams of the wood rosin and 337 grams of conductive carbon black (Shawinigan acetylene black, supplied by Shawinigan Products Corporation). With cold water in its jacket, the mixer was operated for 40 minutes, during which additional wood rosin and carbon black were added in increments until the mixture included a total of 540 grams of wood rosin and 575 grams of carbon black. At the end of this mixing operation the power input was over 1200 watts. Steam was next introduced into the jacket of the mixer for 40 seconds, after which 47 grams of hydrogenated methyl ester of wood rosin (Hercolyn, a liquid tackifier supplied by Hercules, Inc.) were gradually added. After this addition was completed, 55 minutes from the start of the mixing operation, mixing continued, with cold water and crushed Dry Ice again being introduced into the jacket so as to hold the power input above 1200 watts and improve dispersion. The adhesive was then completed by 18 minutes of mixing, after which the addition of Dry Ice was discontinued and steam introduced into the jacket for four minutes to soften the mixture. The adhesive was then dissolved by gradually adding 1650 grams of toluene and 2590 grams of heptane; 3 grams of Copper Inhibitor 50 were also added.

This solution of adhesive was knife-coated on one-ounce, dead-soft copper foil, and the coated foil then dried for 150 seconds at 130° F. followed by 150 seconds at 250° F. The dry adhesive weight was 6.8 grains per 24 square inches. Adhesion of this completed pressure-sensitive adhesive tape was found to be 36 ounces per inch of width, and the resistance through the tape averaged 0.70 ohm per square inch. In the test for homogeneous conductivity described in Example 1, a low-resistance connection was established to each of the 144 channels.

It was determined, by preparing a batch of base adhesive material similar to the black-loaded adhesive except for omission of the black, that the internal strength of the adhesive base material was one minute. By contrast, the black-loaded adhesive of the tape of this example exhibited an internal strength of 462.8 minutes.

Example 3

A solution was prepared from 100 grams of a solvent mixture of toluene and xylene and 100 grams of a silicone adhesive material that included 50 weight percent of a dry methyl siloxane having a viscosity in excess of 1,000,000 centipoises at 25° C. and 50 weight percent of a copolymer composed of $(CH_3)_3SiO_{0.5}$ units and $SiO_2$ units having a general average of about 1.2 methyl units per silicon atom (C 280 adhesive, supplied by Dow-Corning Corp.). This solution was mixed with 30 grams of Vulcan XC 72 conductive carbon black and the mixture then passed three times through a small paint mill in which the orifices between the rolls were set at two mils.

Tape was prepared by knife-coating this solution of adhesive onto one-ounce dead-soft copper foil and drying the coated foil 200 seconds at 200° F. and 200 seconds at 220° F. The dry weight of the adhesive was 16.2 grains per 24 square inches. The tape was passed through a laboratory calender at light pressure after the drying operation to smooth the adhesive surface.

Adhesion of the tape was measured as 17 ounces per inch of width, and resistance through the tape was found to average 0.95 ohm per square inch. In the test for homogeneous conductivity, a low-resistance connection was made with each of the 144 channels.

The softness of the base adhesive material without carbon black was measured as 3.1 minutes, whereas the black-loaded adhesive in the tape of this example exhibited a softness of 676 minutes.

I claim:

1. An electrically conductive pressure-sensitive adhesive tape comprising an electrically conductive flexible backing, on at least one side of which is firmly adhered a thin layer of an adhesive that includes (a) 10 parts of a base rubber-resin pressure-sensitive adhesive material having an internal strength in the test described herein of less than 15 minutes, and (b) between about 25 and 70 parts of electrically conductive carbon black uniformly dispersed in the adhesive material, the tape exhibiting a pressure-sensitive adhesion of at least 10 ounces per inch of width and an electrical resistance through the adhesive layer of less than one ohm per square inch.

2. A tape of claim 1 in which the base adhesive material includes natural rubber extensively milled to soften it.

3. A tape of claim 1 in which the backing is a thin metal foil, the base adhesive material has an internal strength in the test described of less than 10 minutes, the adhesive includes between about 40 and 55 parts of electrically conductive carbon black, and the adhesive layer is less than two mils thick.

References Cited

UNITED STATES PATENTS

| 2,498,493 | 2/1950 | Hickernell | 117—226 X |
| 2,525,864 | 10/1950 | Carter | 117—122 P |
| 3,475,213 | 10/1969 | Stow | 117—122 P |

FOREIGN PATENTS

| 17,977 | 6/1965 | Japan | 117—122 P |

ALFRED L. LEAVITT, Primary Examiner

M. F. ESPOSITO, Assistant Examiner

U.S. Cl. X.R.

117—122 P, 122 PA